(12) United States Patent
Luberto et al.

(10) Patent No.: US 10,398,239 B1
(45) Date of Patent: Sep. 3, 2019

(54) DISPLAYING ARTICLES OF MERCHANDISE AT A POINT-OF-PURCHASE

(71) Applicant: Henschel-Steinau, Inc., Allendale, NJ (US)

(72) Inventors: Michael D. Luberto, River Vale, NJ (US); Getachew Kassa, West Orange, NJ (US)

(73) Assignee: Henschel-Steinau, Inc., Allendale, NJ (US)

( * ) Notice: Subject to any disclaimer, the term of this patent is extended or adjusted under 35 U.S.C. 154(b) by 0 days.

(21) Appl. No.: 16/210,285

(22) Filed: Dec. 5, 2018

(51) Int. Cl.
| | | |
|---|---|---|
| *A47F 7/00* | (2006.01) | |
| *G06Q 30/02* | (2012.01) | |
| *A47F 5/16* | (2006.01) | |
| *A47F 13/08* | (2006.01) | |
| *A47F 5/00* | (2006.01) | |
| *A47B 65/00* | (2006.01) | |

(52) U.S. Cl.
CPC .......... *A47F 7/0028* (2013.01); *A47F 5/0093* (2013.01); *A47F 5/16* (2013.01); *A47F 13/08* (2013.01); *G06Q 30/0268* (2013.01); *A47B 65/00* (2013.01); *A47F 2005/0075* (2013.01)

(58) Field of Classification Search
CPC ...... A47F 7/0028; A47F 13/08; A47F 5/0093; A47F 2005/0075; A47F 5/005; A47B 65/15; A47B 65/10; A47B 65/20; A47B 65/00; G06Q 30/0268
USPC ....... 211/184, 59.2, 59.3, 59.4, 70.6, 65, 42, 211/43; 206/477, 480, 478; 312/348.3
See application file for complete search history.

(56) References Cited

U.S. PATENT DOCUMENTS

| | | | | |
|---|---|---|---|---|
| 113,830 | A * | 4/1871 | Anderson | B62B 5/0083 280/47.32 |
| 388,674 | A * | 8/1888 | Harrington | A47B 65/00 211/43 |
| 431,373 | A * | 7/1890 | Mendenhall | A47B 65/00 211/43 |
| 525,186 | A * | 8/1894 | Bowley | B65D 85/68 206/335 |
| 1,621,410 | A * | 3/1927 | House | A47B 65/20 211/43 |
| 1,674,359 | A * | 6/1928 | Frey | B42F 17/02 211/43 |
| 1,876,346 | A * | 9/1932 | Riddel | A47B 65/00 211/43 |

(Continued)

*Primary Examiner* — Jonathan Liu
*Assistant Examiner* — Devin K Barnett
(74) *Attorney, Agent, or Firm* — Arthur Jacob

(57) ABSTRACT

Apparatus and method display articles of merchandise r aligned in a desired stable orientation for viewing and selection at a point-of-purchase. Each article includes a member of predetermined cross-sectional configuration extending between a working head and a terminal end of the article. The member is inserted between a pair of bowed, confronting resiliently deflectable stabilizing fingers coupled to a platform, with the member received within an aperture in each finger. At the same time, the terminal end of the article is inserted into a socket in the platform. The apertures are configured to retain the article between the fingers for displaying the article, thereby maintaining the article aligned in the stable desired orientation for viewing and selective release at the point-of-purchase.

10 Claims, 5 Drawing Sheets

(56) References Cited

U.S. PATENT DOCUMENTS

| | | | | |
|---|---|---|---|---|
| 2,160,050 A * | 5/1939 | Wolf | A47F 7/22 | 2/115 |
| 2,219,145 A * | 10/1940 | Wolf | A47F 7/22 | 2/115 |
| 2,299,780 A * | 10/1942 | Wolf | A47F 7/22 | 211/59.4 |
| 2,323,892 A * | 7/1943 | Bricker | A47B 65/00 | 211/195 |
| 2,934,215 A * | 4/1960 | Mogulescu | A47F 5/10 | 211/133.1 |
| D192,017 S * | 1/1962 | Moore | 211/41.11 | |
| 3,233,611 A * | 2/1966 | Stewart | B42F 13/0073 | 16/231 |
| D215,897 S * | 11/1969 | Aydelotte | D19/90 | |
| 4,163,497 A * | 8/1979 | McEwen | B42F 17/12 | 211/11 |
| 4,512,480 A * | 4/1985 | Evenson | B42F 17/12 | 108/60 |
| 4,569,447 A * | 2/1986 | Cifranic | A47B 65/20 | 211/181.1 |
| 5,080,314 A * | 1/1992 | Moyer | B65D 19/44 | 206/391 |
| 5,205,420 A * | 4/1993 | Petryszak | A47B 65/00 | 211/184 |
| 5,598,932 A * | 2/1997 | Weidert | A47F 3/0486 | 211/41.1 |
| 5,806,690 A * | 9/1998 | Johnson | A47F 1/126 | 211/175 |
| D413,700 S * | 9/1999 | Wang | D32/55 | |
| 6,041,720 A * | 3/2000 | Hardy | A47B 96/02 | 108/60 |
| 6,244,447 B1 * | 6/2001 | Frieze | A61L 2/07 | 206/370 |
| 6,497,326 B1 * | 12/2002 | Osawa | A47F 7/28 | 211/59.2 |
| 6,666,533 B1 * | 12/2003 | Stavros | A47B 88/969 | 312/348.3 |
| D501,629 S * | 2/2005 | Heiberg | D7/631 | |
| D507,156 S * | 7/2005 | Heiberg | D7/631 | |
| D532,215 S * | 11/2006 | Calabria | D6/678.4 | |
| 7,380,894 B2 * | 6/2008 | Berger | A47B 88/994 | 312/348.3 |
| 7,424,957 B1 * | 9/2008 | Luberto | A47F 1/126 | 211/59.3 |
| 7,703,866 B2 * | 4/2010 | Benz | F25D 25/02 | 211/184 |
| 8,322,544 B2 * | 12/2012 | Hardy | A47F 1/126 | 211/184 |
| 8,328,027 B2 * | 12/2012 | Barkdoll | A47F 1/126 | 211/184 |
| 8,919,580 B2 * | 12/2014 | Johnson | A47F 1/12 | 211/59.2 |
| 8,943,719 B1 * | 2/2015 | Post-Smith | G09F 1/10 | 211/144 |
| D760,519 S * | 7/2016 | Le | D6/706 | |
| 9,565,952 B1 * | 2/2017 | Luberto | A47F 1/126 | |
| D786,026 S * | 5/2017 | Goodman | D7/631 | |
| 9,782,017 B1 * | 10/2017 | Luberto | A47F 1/125 | |
| 10,117,528 B2 * | 11/2018 | Collette | A47F 5/005 | |
| 10,123,637 B1 * | 11/2018 | DeSena | A47F 5/005 | |
| 10,165,871 B2 * | 1/2019 | Hardy | A47F 1/126 | |
| D840,767 S * | 2/2019 | Dittrich | D7/631 | |
| 2003/0010737 A1 * | 1/2003 | Lee | A47F 3/147 | 211/184 |
| 2006/0186064 A1 * | 8/2006 | Merit | A47F 1/126 | 211/59.3 |
| 2007/0068884 A1 * | 3/2007 | DiPietro | A47G 21/16 | 211/50 |
| 2007/0090068 A1 * | 4/2007 | Hardy | A47F 1/126 | 211/59.3 |
| 2007/0158281 A1 * | 7/2007 | Hardy | A47F 1/126 | 211/59.3 |
| 2007/0159040 A1 * | 7/2007 | Fernandez | B25H 3/023 | 312/348.3 |
| 2009/0065453 A1 * | 3/2009 | Smith | B42F 7/12 | 211/11 |
| 2010/0078402 A1 * | 4/2010 | Davis | A47F 57/585 | 211/184 |
| 2010/0252519 A1 * | 10/2010 | Hanners | A47F 5/005 | 211/184 |
| 2011/0100941 A1 * | 5/2011 | Luberto | A47F 1/126 | 211/134 |
| 2011/0174750 A1 * | 7/2011 | Poulokefalos | A47F 1/126 | 211/59.3 |
| 2012/0205334 A1 * | 8/2012 | Liu | A47B 45/00 | 211/162 |
| 2013/0026117 A1 * | 1/2013 | Hardy | A47F 1/126 | 211/59.3 |
| 2013/0306582 A1 * | 11/2013 | Chen | A47F 1/00 | 211/59.4 |
| 2014/0034591 A1 * | 2/2014 | Szpak | A47F 1/04 | 211/59.2 |
| 2014/0138330 A1 * | 5/2014 | Hardy | A47B 57/588 | 211/59.3 |
| 2014/0263133 A1 * | 9/2014 | Walker | A47F 5/005 | 211/184 |
| 2014/0263134 A1 * | 9/2014 | Walker | A47F 5/005 | 211/184 |
| 2014/0299560 A1 * | 10/2014 | Kim | A47F 1/126 | 211/59.2 |
| 2014/0305889 A1 * | 10/2014 | Vogler | A47F 1/125 | 211/59.3 |
| 2015/0053631 A1 * | 2/2015 | Hardy | A47F 1/126 | 211/59.3 |
| 2015/0289683 A1 * | 10/2015 | Walker | A47F 5/005 | 211/59.3 |
| 2016/0073776 A1 * | 3/2016 | Zeidner | A47B 57/588 | 211/134 |
| 2016/0242573 A1 * | 8/2016 | Colelman | A47F 5/005 | |
| 2018/0110332 A1 * | 4/2018 | Nye | A47B 81/005 | |

* cited by examiner

DISPLAYING ARTICLES OF MERCHANDISE AT A POINT-OF-PURCHASE

The present invention relates generally to the display of articles of merchandise at a point-of-purchase and pertains, more specifically, to apparatus and method for displaying particular articles in a manner wherein the articles are made available in an aesthetically attractive, stable array enabling essentially full viewing and increased ease of selection.

As retail sales increasingly rely upon self-service wherein a purchaser can view articles of merchandise offered for sale and select a particular item, it becomes more important to enable purchasers to view fully such articles presented at a point-of-purchase to facilitate selection and removal of the selected item from a display. At the same time, the article must remain stable and secure in the display while being presented in an attractive array at the point-of-purchase. These requirements present a challenge when the articles being displayed are bulky or present an unwieldy configuration such as, for example, a styling hairbrush which includes a rather bulky, bristled working head carried by a more-or-less conventional, relatively slender handle.

The present invention provides apparatus and method for displaying, for selection at a point-of-purchase, articles of merchandise of the above description. As such, the present invention attains several objects and advantages, some of which are summarized as follows: Displays articles of merchandise for essentially full viewing at a point-of-purchase with increased ease of inspection and selected removal for purchase; provides a secure and stable retention of relatively bulky or unwieldy items for display in an attractive stable array at a point-of-purchase, while facilitating selected removal for completing a sale of a selected item; enables ready restocking of articles of merchandise aligned at a desired stable orientation within an attractive array at a point-of-purchase; provides a stable, orderly and aesthetically pleasing arrangement of relatively bulky or unwieldy articles of merchandise displayed at a point-of-purchase; enables ease of assembly and placement of a display offering relatively bulky, unwieldy items at a point-of-purchase along a display shelf; provides apparatus and method for displaying articles at a point-of-purchase with increased economy and exemplary performance over an extended service life.

The above objects and advantages, as well as further objects and advantages, are attained by the present invention which may be described briefly as apparatus for displaying articles of merchandise aligned in a desired stable orientation for viewing and selection at a point-of-purchase, each article including a member of predetermined cross-sectional configuration extending between a working head and a terminal end of the article, the apparatus comprising: a platform; at least one socket in the platform, the socket having a cross-sectional configuration substantially complementary to the predetermined cross-sectional configuration of the member, adjacent the terminal end of the article; a pair of resiliently deflectable stabilizing fingers, each finger having a tip and an opposite base for coupling the finger to the platform, with the fingers confronting one-another at transversely opposite positions about the socket in the platform, each finger following a bowed profile configuration having an apex placed at a location intermediate the tip and the base of the finger, the fingers being placed relative to one-another such that apexes of the fingers confront one-another at the location intermediate each corresponding tip and a corresponding base; and an aperture in each finger, each aperture being juxtaposed with a corresponding apex and having a peripheral edge extending between a first end of the aperture, adjacent the corresponding tip, and a second end of the aperture, adjacent the corresponding base, each peripheral edge providing a profile configuration whereby upon insertion of the terminal end of an article within the socket at the platform, the member of predetermined cross-sectional configuration of the article will enter each aperture to be engaged by the peripheral edge of each aperture, resiliently within the confronting apertures of the fingers, thereby maintaining the article stable, aligned in the desired orientation, for viewing and selective release at the point-of-purchase.

In addition, the present invention provides a method for displaying articles of merchandise aligned in a desired stable orientation for viewing and selection at a point-of-purchase, each article including a member of predetermined cross-sectional configuration extending between a working head and a terminal end of the article, the method comprising: placing a platform at the point-of-purchase; providing at least one socket in the platform, the socket having a cross-sectional configuration substantially complementary to the predetermined cross-sectional configuration of the member, at the terminal end of the article; coupling a pair of resiliently deflectable stabilizing fingers to the platform, each finger having a tip and an opposite base, with the fingers confronting one-another at transversely opposite positions about the socket in the platform, each finger following a bowed profile configuration having an apex placed at a location intermediate the tip and the base of the finger, the fingers being placed relative to one-another such that apexes of the fingers confront one-another at the location intermediate a corresponding tip and a corresponding base; juxtaposing an aperture with a corresponding apex in each finger, each aperture having a peripheral edge extending between a first end of the aperture, adjacent the corresponding tip, and a second end of the aperture, adjacent the corresponding base, each peripheral edge providing a corresponding profile configuration; and inserting the terminal end of an article within the socket at the platform, and entering the member of predetermined cross-sectional configuration of the article into each aperture to be engaged by the peripheral edge of each aperture, resiliently within the confronting apertures of the fingers, thereby maintaining the article stable, aligned in the desired orientation, for viewing and selective release at the point-of-purchase.

The invention will be understood more fully, while still further objects and advantages will become apparent, in the following detailed description of preferred embodiments of the invention illustrated in the accompanying drawing, in which.

Figure 1:
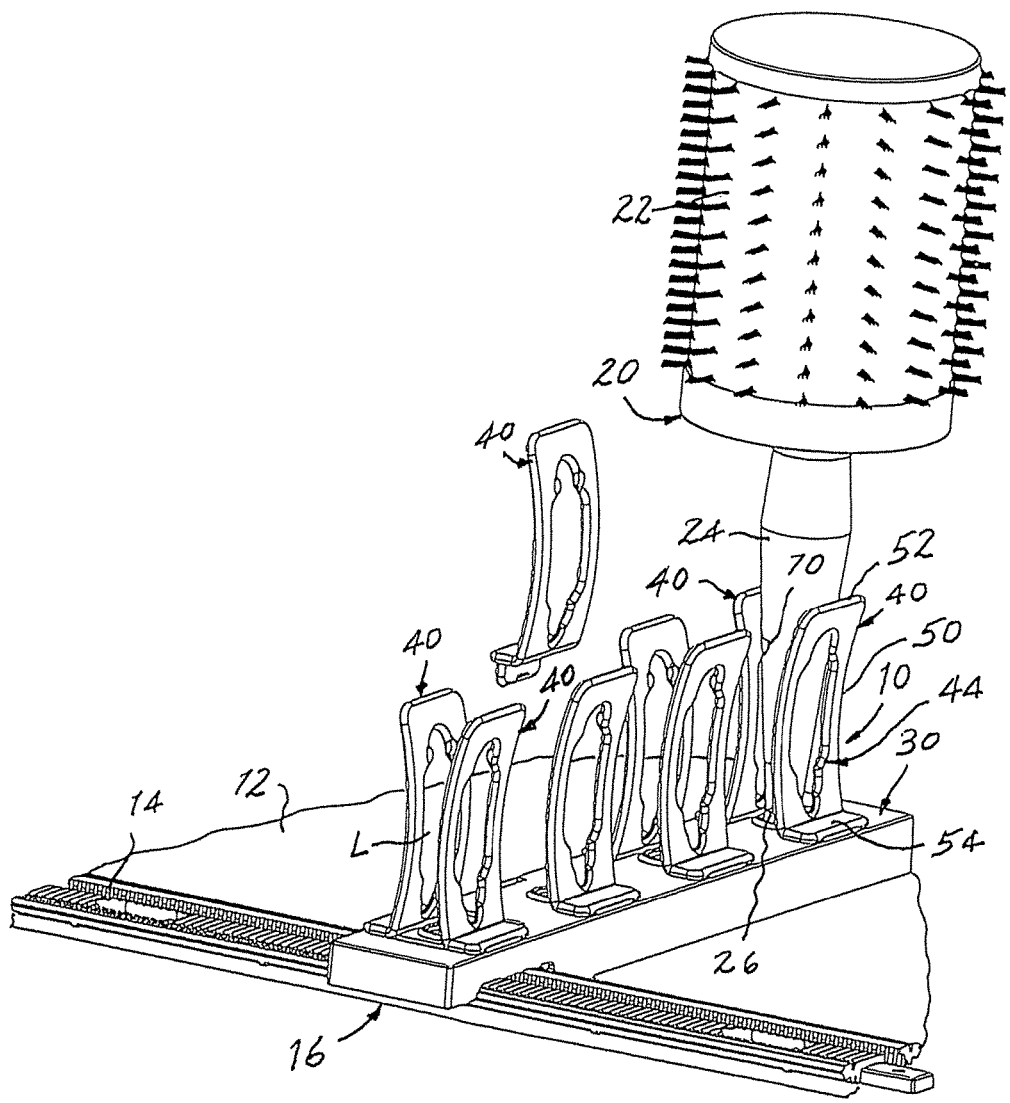
FIG. 1 is a pictorial view, partially exploded, showing a display constructed and in use in accordance with the present invention.
Figure 2:
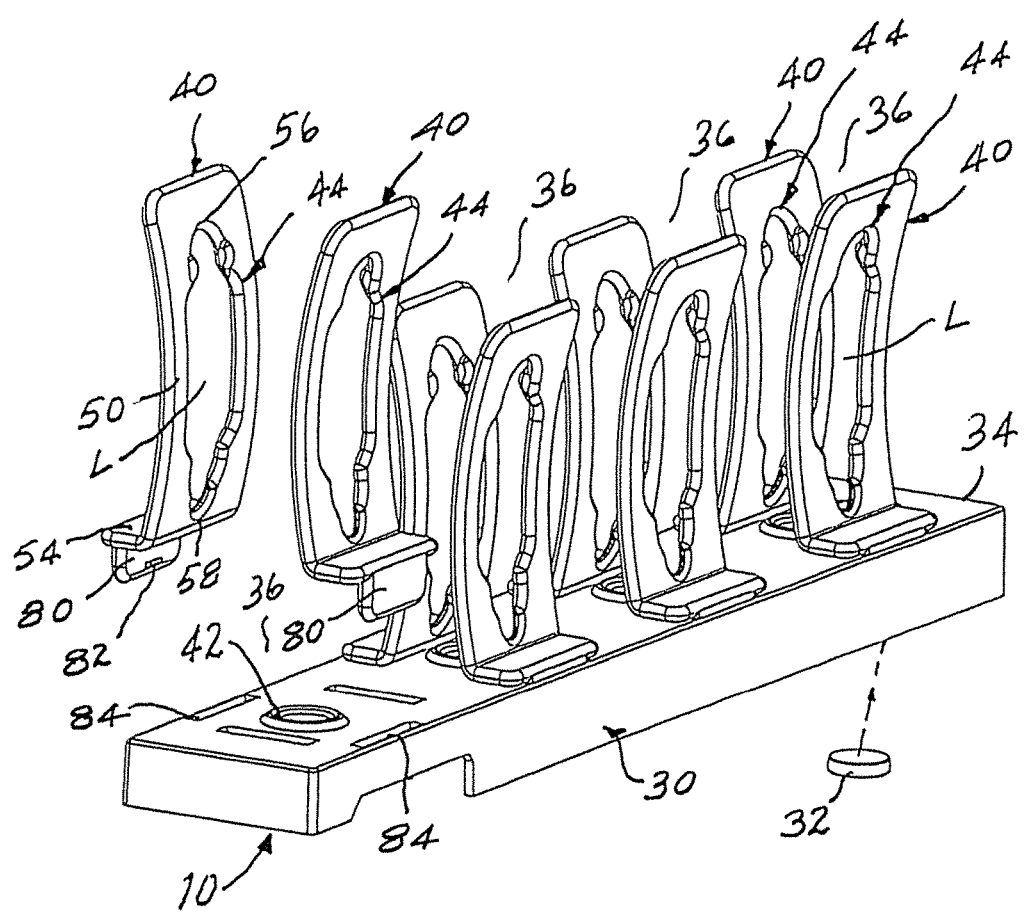
FIG. 2 is a pictorial view, partially exploded, showing component parts of the display being assembled in accordance with the present invention.
Figure 3:
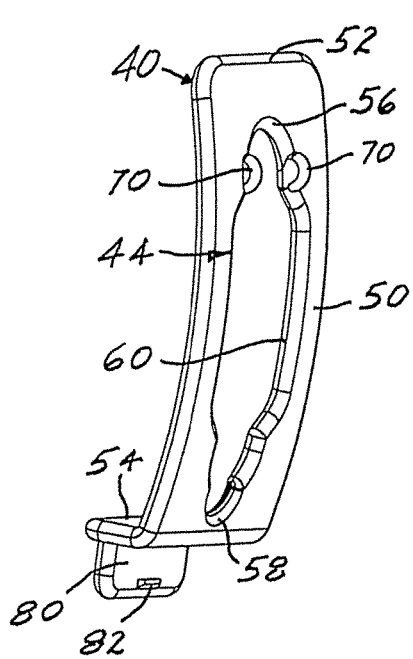
FIG. 3 is a front and left side pictorial view of a component part of the display.
Figure 4:
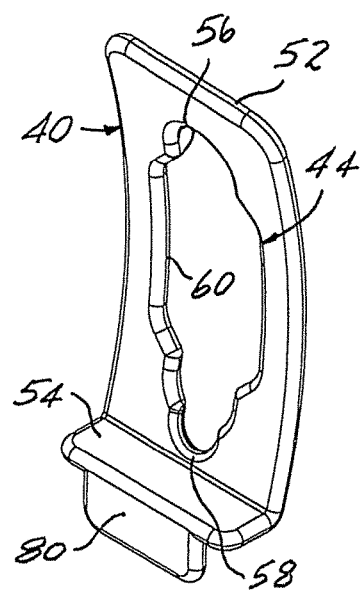
FIG. 4 is a rear and left side pictorial view of the component part.

Referring now to the drawing, and especially to FIG. 1 thereof, a display constructed in accordance with the present invention is shown at 10 and is seen placed upon a shelf 12, located along a track 14 affixed to the shelf 12, to place display 10 at a point-of-purchase 16. Display 10 is in place, in the present example, to display articles of merchandise shown in the form of a hairstyling brush 20 of the type having a working head in the form of a bristled cylindrical head 22 carried by a more-or-less conventional slender, cylindrical handle 24 extending in a tapered, predetermined cross-sectional configuration from bristled head 22 to a distal terminal end 26 of the brush 20.

With reference now to FIGS. 2 through 9, as well as to FIG. 1, display 10 includes a platform 30 constructed for resting upon shelf 12, locked in place along the track 14, in a manner more fully described in an earlier patent, U.S. Pat. No. 7,918,353, the disclosure of which is incorporated herein by reference thereto. As an added measure, a permanent magnet 32 is affixed to the platform 30, adjacent rearward end 34 of platform 30, for anchoring rearward end 34 in place along shelf 12.

Exemplary display 10 is constructed for displaying, in the illustrated embodiment, four brushes 20, each at a respective one of four stations 36, one of which brushes 20 is shown mounted in place in display 10. As illustrated, brush 20 is captured between a pair of confronting resiliently deflectable fingers 40 carried by platform 30, with distal terminal end 26 seated within a receptacle in the platform 30, the receptacle being shown in the form of a socket 42 having a cross-sectional configuration substantially complementary to the predetermined cross-sectional configuration of handle 24 adjacent the distal terminal end 26, with handle 24 grasped resiliently within confronting apertures 44 in the corresponding pair of fingers 40.

In order to compensate for any variations in transverse dimensions of handle 24 of different brushes 20, while maintaining a stable engagement with the handle 24 and thereby retaining a brush 20 aligned in a stable desired orientation upon platform 30, each finger 40 follows a bowed profile configuration having an apex 50 located altitudinally essentially centrally between an upper tip 52 and a lower base 54, and the fingers 40 are positioned relative to one-another such that apexes 50 of confronting fingers 40 confront one-another at a location L intermediate a corresponding tip 52 and base 54. Each aperture 44 is juxtaposed with a corresponding apex 50 and extends between a first end 56 adjacent a corresponding tip 52 and a second end 58 adjacent a corresponding base 54.

Figure 5:
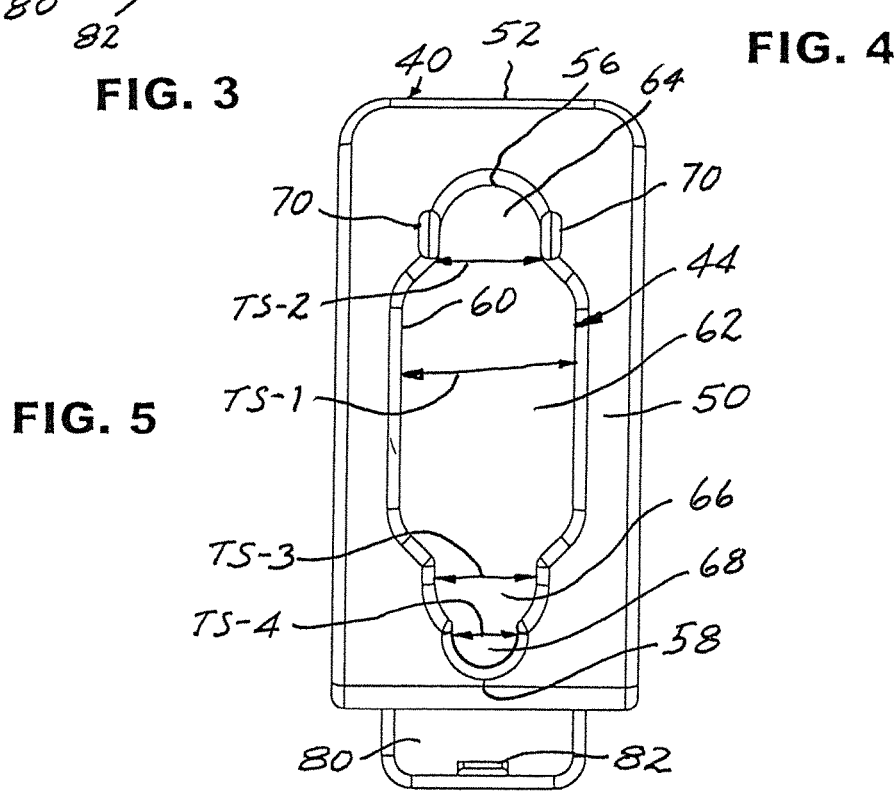
FIG. 5 is an enlarged front elevational view of the component part.
Figure 6:
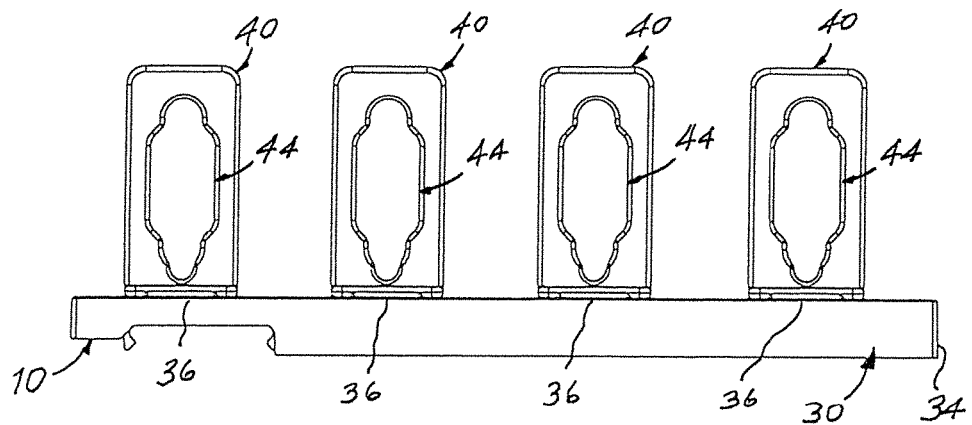
FIG. 6 is a front elevational view of the display.
Figure 7:
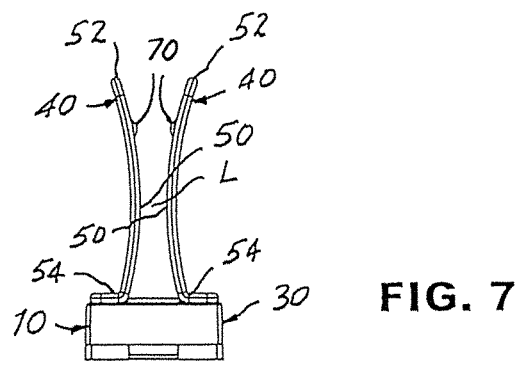
FIG. 7 is a left side elevational view of the display.
Figure 8:
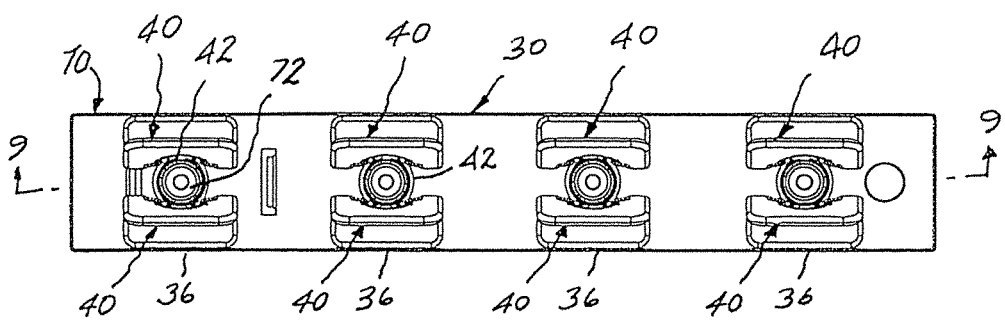
FIG. 8 is a top plan view of the display.
Figure 9:
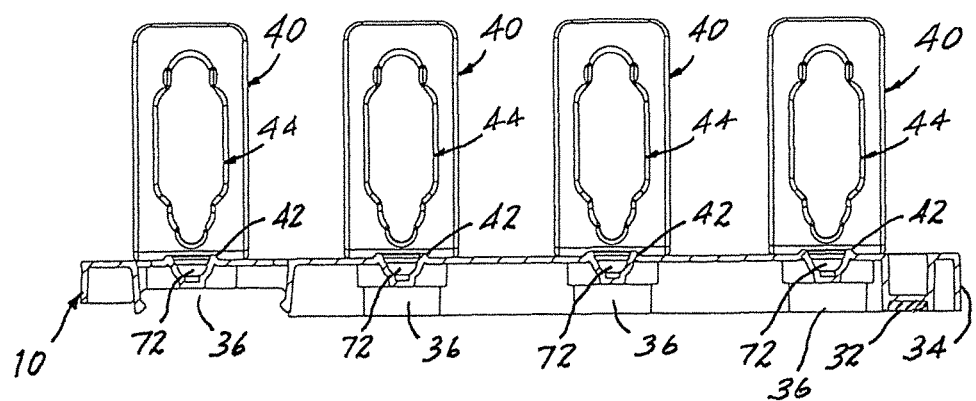
FIG. 9 is a longitudinal cross-sectional view taken along line 9-9 of FIG. 8.

As best seen in FIG. 5, each aperture 44 has a profile configuration along a peripheral edge 60 providing a first section 62 of relatively larger transverse span TS-1, located adjacent the apex 50, a second section 64 having a transverse span TS-2, relatively smaller than transverse span TS-1, located between first section 62 and first end 56 of aperture 44, a third section 66 having a transverse span TS-3, relatively smaller than transverse span TS-2 and located between first section 62 and a fourth section 68 having a transverse span TS-4, relatively smaller than transverse span TS-3, and placed between third section 66 and second end 58 of aperture 44. Thus, the combination of the bowed profile configuration of fingers 40, with confronting apexes 50, and the aforesaid profile configuration that establishes sections 62, 64, 66 and 68 of confronting apertures 44, enables peripheral edges 60 along confronting apertures 44 to grasp handle 24 firmly, with the different transverse spans provided by sections 62, 64, 66 and 68 compensating for any variations in the predetermined cross-sectional configuration of any handle 24 of different brushes 20 encountered in the field so as to retain such brush 20 in stable alignment within a corresponding station 36, oriented to enable an unobstructed view of the corresponding bristled head 22 and to allow convenient selected release of the brush 20 by a purchaser, while maintaining an orderly, aesthetically pleasing array of brushes 20 mounted within stations 36. In addition, the construction facilitates restocking by simplifying insertion of a replacement brush 20 upon observing a vacant station 36.

In order further to assure stability of a brush 20 while held at a station 36 in display 10, each finger 40 is provided with stabilizing projections 70 juxtaposed with aperture 44, preferably located adjacent upper tip 52, for engaging handle 24, as seen in FIG. 1, and socket 42 is provided with a well 72 configured essentially complementary to handle 24, adjacent terminal end 26, for receiving handle 24 adjacent terminal end 26 to establish further a stable reception of brush 20 within platform 30.

Display 10 is assembled readily in the field by merely joining fingers 40 with platform 30. To that end each finger 40 includes a basal connector shown in the form of a tab 80 depending from base 54 and carrying a detent 82. Tab 80 is inserted into a complementary slot 84 in platform 30 and is locked in place, with confronting fingers 40 placed at transversely opposite positions about a corresponding socket 42, each finger 40 being itself stabilized upon platform 30 by a corresponding base 54. It is noted that platform 30 can be constructed with any desired number of stations 36 provided with sockets 42 and slots 84 for the reception of any corresponding number of pairs of fingers 40 to establish any selected number of positions in any selected pattern for the reception of a corresponding number of brushes 20 for display in a desired, attractive array.

Fingers 40 preferably are molded of a resiliently deflectable transparent synthetic polymeric material, such as a polycarbonate, with all fingers 40 having an identical, interchangeable configuration for versatility, convenience and economy. By virtue of being transparent, fingers 20 do not obscure a full view of a displayed brush 20 and the array within which brushes 20 are placed.

It will be seen that the present invention attains the several objects and advantages summarized above, namely: Displays articles of merchandise for essentially full viewing at a point-of-purchase with increased ease of inspection and selected removal for purchase; provides a secure and stable retention of relatively bulky or unwieldy items for display in an attractive stable array at a point-of-purchase, while facilitating selected removal for completing a sale of a selected item; enables ready restocking of articles of merchandise aligned at a desired stable orientation within an attractive array at a point-of-purchase; provides a stable, orderly and aesthetically pleasing arrangement of relatively bulky or unwieldy articles of merchandise displayed at a point-of-purchase; enables ease of assembly and placement of a display offering relatively bulky, unwieldy items at a point-of-purchase along a display shelf; provides apparatus and method for displaying articles at a point-of-purchase with increased economy and exemplary performance over an extended service life.

It is to be understood that the above detailed description of preferred embodiments of the invention is provided by way of example only. Various details of design, construction and procedure may be modified without departing from the true spirit and scope of the invention, as set forth in the appended claims.

The embodiments of the invention in which an exclusive property or privilege is claimed are defined as follows:

1. An article holder for displaying articles of merchandise aligned in a desired stable orientation for viewing and selection on a shelf, each article including a mid-section having a predetermined cross-sectional configuration extending between a top head portion and a terminal end of each article respectively, the article holder comprising:

a generally planar platform comprising a plurality of slots formed therein, wherein the platform is configured to be secured to a shelf;

a plurality of circular socket recesses formed in the platform, wherein the socket recesses are spaced apart from the plurality of slots, wherein each socket recess having a cross-sectional configuration substantially complementary to the terminal end of each article respectively, wherein the terminal end of each article is configured to be inserted within each socket recess respectively;

a plurality of pairs of resiliently deflectable stabilizing fingers, each finger having a tip at a top end thereof and an opposite base at a bottom end thereof; wherein a tab is attached to a bottom surface of each base and extends downwardly therefrom in a cantilevered manner respectively, wherein each tab is configured to be inserted within a corresponding slot from said plurality of slots of the platform for coupling each finger to the platform, wherein each pair of fingers comprise a first finger and a second finger that mirror each other about a vertical axis at transversely opposite positions about each socket recess in the platform respectively, wherein each finger is bow shaped having an apex at a location intermediate the tip and the base of each finger, wherein the apex of the first finger and the apex of the second finger of each pair of fingers face each other and are parallel to each other;

and wherein an aperture is formed in each finger, each aperture being juxtaposed with each apex respectively and each aperture having a peripheral edge extending continuously between a first end, adjacent to each tip respectively and a second end adjacent to each base respectively, each peripheral edge providing a profile configuration whereby upon insertion of the terminal end of each article within each socket recess respectively, a portion of the mid-section of each article will resiliently enter the apertures of each pair of fingers respectively to maintain each article in a stable and aligned vertical orientation.

2. The article holder of claim 1, wherein each aperture is comprised of sections of different transverse spans including a section of a first transverse span located adjacent to each apex respectively, and a section of a second transverse span smaller than the first transverse span, placed between the section of the first transverse span and at least one of the first and second ends of each aperture respectively.

3. The article holder of claim 2, wherein each each second transverse span is placed between the first transverse span and the first end of each aperture respectively, wherein a section having a third transverse span smaller than the second transverse span is placed between the first transverse span and the second end of each aperture respectively, and a fourth transverse span smaller than the third transverse span is placed between the third transverse span and the second end of each aperture respectively.

4. The article holder of claim 3, wherein each finger includes stabilizing projections juxtaposed with each aperture respectively, wherein the stabilizing projections of each pair of fingers engage the mid-section of each article respectively.

5. The article holder of claim 4, wherein the stabilizing projections are located adjacent to the first end of each aperture respectively.

6. A method for displaying articles of merchandise aligned in a desired stable orientation for viewing and selection on a shelf, each article including a mid-section having a predetermined cross-sectional configuration extending between a top head portion and a terminal end of each article respectively, the method comprising the steps of:

placing a generally planar platform on a shelf, the platform comprising a plurality of slots formed therein, wherein the platform is configured to be secured to the shelf;

providing a plurality of circular socket recesses formed in the platform, wherein the socket recesses are spaced apart from the plurality of slots, wherein each socket recess having a cross-sectional configuration substantially complementary to the terminal end of each article respectively, wherein the terminal end of each article is configured to be inserted within each socket recess respectively;

coupling a plurality of pairs of resiliently deflectable stabilizing fingers to the platform, each finger having a tip at a top end thereof and an opposite base at a bottom end thereof; wherein a tab is attached to a bottom surface of each base and extends downwardly therefrom in a cantilevered manner respectively, wherein each tab is configured to be inserted within a corresponding slot from said plurality of slots of the platform for coupling each finger to the platform, wherein each pair of fingers comprise a first finger and a second finger that mirror each other about a vertical axis at transversely opposite positions about each socket recess in the platform respectively, wherein each finger is bow shaped having an apex at a location intermediate the tip and the base of each finger, wherein the apex of the first finger and the apex of the second finger of each pair of fingers face each other and are parallel to each other;

juxtaposing an aperture with a corresponding apex in each finger, each aperture having a peripheral edge extending continuously between a first end adjacent to each tip respectively and a second end adjacent to each base respectively, each peripheral edge providing a corresponding profile configuration; and inserting the terminal end of each article within each socket recess respectively, and entering a portion of the mid-section of each article into the apertures of each pair of fingers respectively to maintain each article in a stable and aligned vertical orientation.

7. The method of claim 6, including providing each aperture with sections of different transverse spans including a section of a first transverse span located adjacent to each apex respectively, and a section of a second transverse span smaller than the first transverse span, placed between the section of the first transverse span and at least one of the first and second ends of each aperture respectively.

8. The method of claim 7, including providing each second transverse span between the first transverse span and the first end of each aperture respectively, wherein a section having a third transverse span smaller than the second transverse span is placed between the first transverse span and the second end of each aperture respectively, and a fourth transverse span smaller than the third transverse span is placed between the third transverse span and the second end of each aperture respectively.

9. The method of claim 8, including further stabilizing the mid-section of each article between each pair of fingers respectively by engaging each mid-section with stabilizing projections juxtaposed with the apertures in each pair of fingers.

10. The method of claim 9, including still further stabilizing the mid-section of each article by inserting the terminal end of each article into a resiliently conformable seat within each socket recess respectively in the platform.

\* \* \* \* \*